Figure 1:
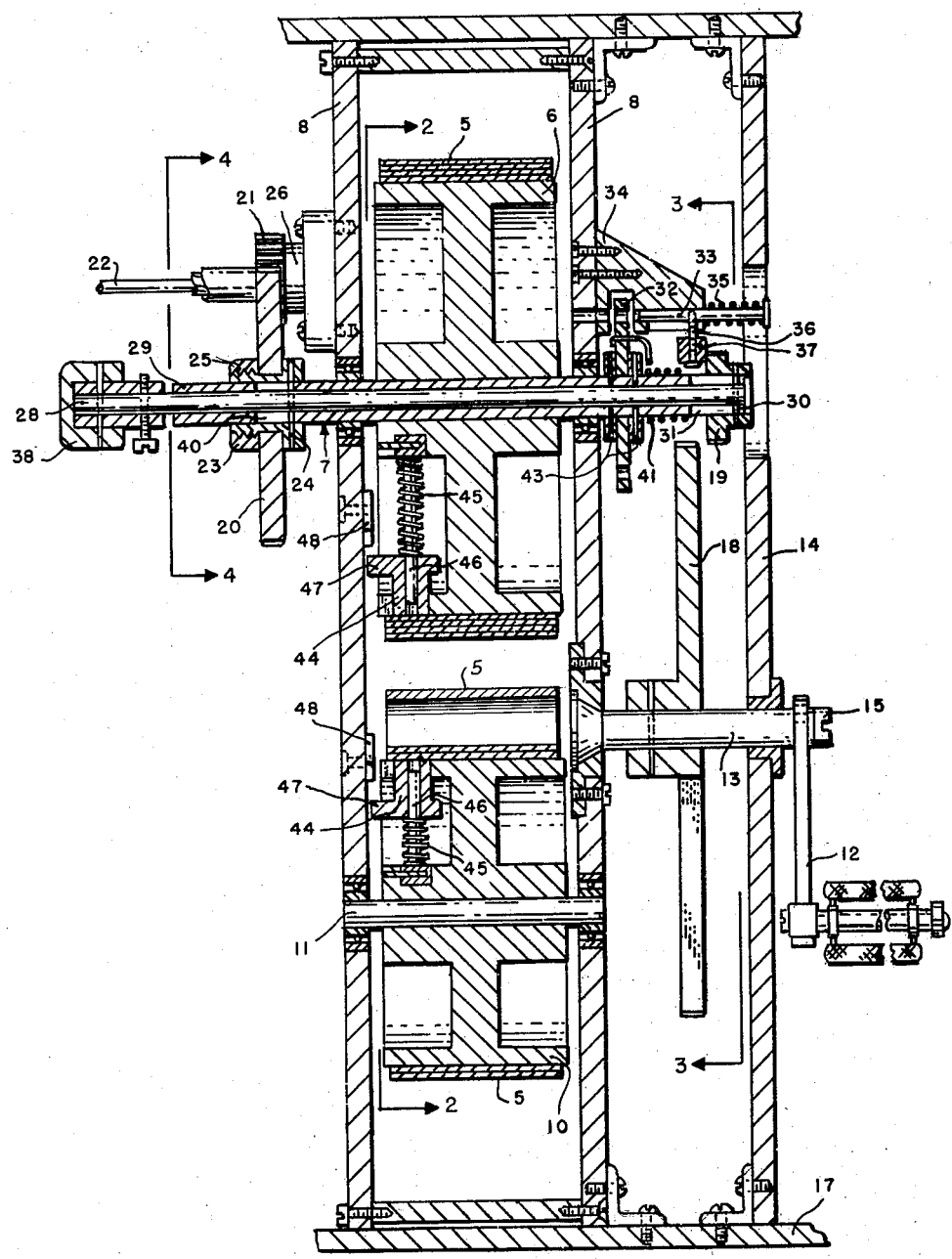

July 22, 1958 — M. KLOSNER — 2,844,217
SPRING MOTOR APPARATUS
Filed Oct. 4, 1956 — 2 Sheets-Sheet 1

INVENTOR.
MORRIS KLOSNER
BY *Frederick M. Shrader*
ATTORNEY

July 22, 1958  M. KLOSNER  2,844,217
SPRING MOTOR APPARATUS

Filed Oct. 4, 1956  2 Sheets-Sheet 2

INVENTOR.
MORRIS KLOSNER
BY *Frederick M. Studer*
ATTORNEY

United States Patent Office
2,844,217
Patented July 22, 1958

2,844,217

SPRING MOTOR APPARATUS

Morris Klosner, Bronx, N. Y., assignor to the United States of America as represented by the Secretary of the Army Application October 4, 1956, Serial No. 614,033

10 Claims. (Cl. 185—37)

(Granted under Title 35, U. S. Code (1952), sec. 266)

The invention described herein may be manufactured and used by or for the Government for governmental purposes, without the payment of any royalty thereon.

This invention relates to spring-powered driving mechanisms and particularly to such mechanisms having a tension element which receives its potential energy by unwinding previously formed spiral convolutions.

The invention supplies a need for portable motive power in places remote from conventional sources of power such as the combat zone of a military engagement. The usual solution to such a problem is the use of such power sources as batteries or internal combustion engines which are extremely heavy and bulky. The device of the present invention is light in weight and small in size, properties which lend great advantage to its use in such places as those where they may be no access to conventional sources of power.

The invention provides a powerful spring motor whose output torque remains substantially constant throughout its operating cycle and in addition efficient control devices are provided to permit shifting from the winding cycle to an output cycle and vice versa. Another feature of the invention which enlarges its usefulness is the provision of means to change the gear ratio of the output elements thereof, thus to vary the driving torque delivered to its output shaft. A foot pedal is also provided to wind the motor, which permits free use of both hands for manipulating the driven device which may be a motion picture camera or other device.

A primary object of the invention is to provide a mechanical power supply capable of efficient operation in any location where conventional power sources are non-existent.

A further object of the invention is to provide a mechanical power source having substantially uniform output torque.

A still further object of the invention is to provide a completely reliable primary power source requiring no battery or other chemically active or fuel consuming means.

A further object of the invention is to provide a source of energy including a spring-type powerizing element in combination with a mechanism which permits variable output torque with substantially no loss of its potential energy.

A further object of the invention is to provide a power source having maximum energy capacity for a minimum of total weight.

Other objects and features of the invention will more fully appear from the following description and will be particularly pointed out in claims.

Figure 2:
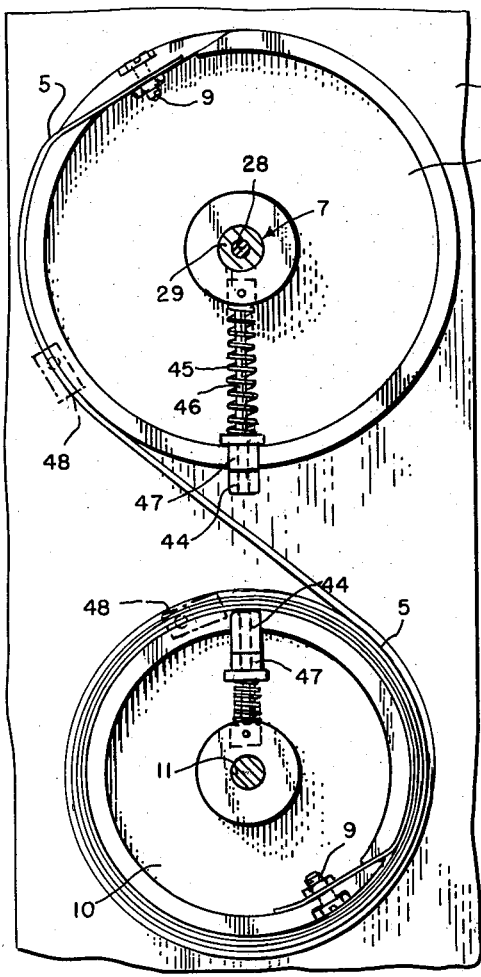
Figure 3:
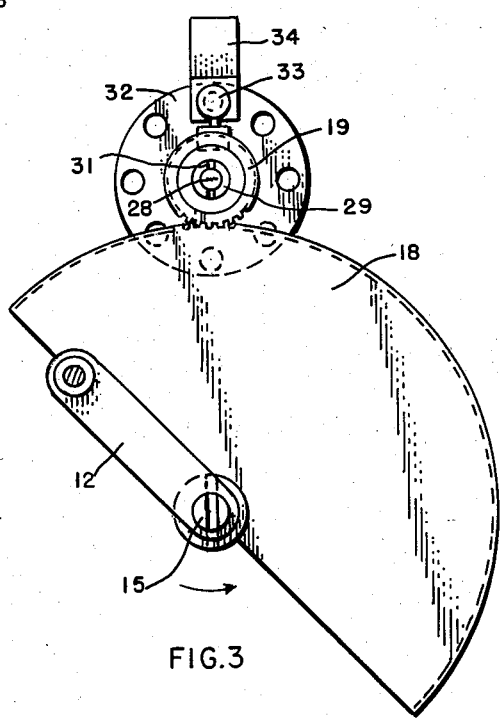
Figure 4:
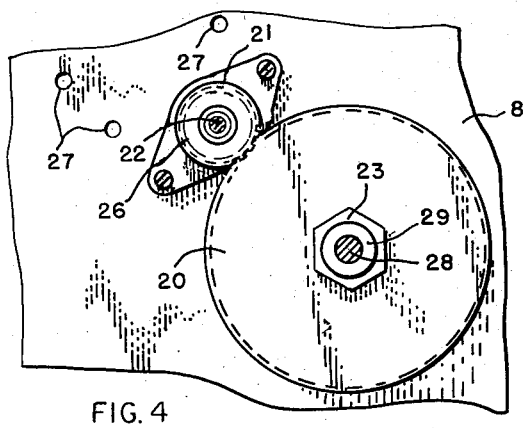

To provide a better understanding of the invention a specific embodiment thereof will be described and illustrated in the accompanying drawings wherein Fig. 1 is a vertical cross-sectional view of the apparatus, Fig. 2 is a detailed view illustrating the tensioning member and its manipulating elements, Fig. 3 is a detailed view illustrating a portion of the winding mechanism, Fig. 4 is a detailed view illustrating the output driving gear assembly.

The invention provides an apparatus which incorporates a spring tension member 5 of special type which functions as the storage means for retaining energy imparted thereto by manual means. Either hand or foot operated means may be used to tension the member 5. The member 5 is received upon a pair of reels, one reel 6 of which is rigidly fixed to an output shaft 7 in any suitable way such as by a key, not shown. The shaft 7 is journaled at its end portions in a pair of supporting plates 8 which in turn are rigidly secured in spaced parallel relation by any suitable means thus to constitute a framework for supporting the elements of the mechanism. Other arrangements may be made for accomplishing this result.

Desirably, but not necessarily, the member 5 is in the form of a spiral ribbon of spring steel, the ends of which are anchored respectively in each reel. The second reel will be described hereinafter. Any suitable means may be used to anchor the spring to the reels, however a desirable construction is to provide angularly disposed slots in the face of the reels through which the ends of the spring are fed, the extremities of the spring are then rigidly anchored to the inner surface of the outer flange of the reels by a suitable clamping means 9.

The second reel 10 is mounted upon a shaft 11 freely rotatable in bearings in the side plates 8. The shafts 7 and 11 are parallel. The spring in its unwound condition may be received upon either one of the reels 6 and 10. As shown in the drawings, it is intended that the spring be received on pulley 10 in its unwound condition. The spring 5 is tensioned by unwinding it from the reel 10 to the reel 6, and when so transferred the full power of the spring becomes available at the output of the motor. The shaft 7 is connected to and drives a load which absorbs the energy in the spring which gradually is fed back to and again becomes wound upon the pulley 10.

To obtain proper functioning of the spring it should be coiled in one direction upon the reel 10 and in the reverse direction upon the other reel. Thus, as shown, the spring when wound tends to unreel from the reel 6 and to wind itself upon the reel 10, thus delivering torque to the output shaft.

Special means are provided for winding or tensioning the spring which may be hand or foot operated. As shown in the drawings, a foot pedal 12 is secured upon the outer end of a shaft 13 which is journaled adjacent to the pedal, in the side wall of a supporting member 14 which may also serve as a housing for the winding mechanism. The inner end of the shaft 13 is supported and rotated in a bearing in the adjacent supporting plate 8. Any suitable means for journaling the shaft 13 may, however, be used. The shaft 13 projects outside the wall 14 to receive the pedal 12. The pedal desirably is removably attached to the shaft 13 by means of an attaching screw 15 which serves to clamp coacting coupling members to lock the pedal in driving position. By coupling the pedal in this manner it may readily be removed and a hand crank substituted therefor.

The housing 14 desirably is secured to a base member 17 to which also the plates 8 are rigidly secured. The base 17 provides a suitable support for the apparatus, particularly when it is operated from a position on the ground.

The shaft 13 has secured thereon a gear segment 18, the teeth of which engage a spring tensioning pinion 19 secured to the drive shaft 7. Thus by actuating the pedal the reel 6 is rotated to tension the spring 5. An arrangement is also provided for engaging and disengaging the pinion 19 from the gear 18. Desirably, this is accomplished by moving the pinion 19 axially to engage and disengage the gears.

Energy from the spring is delivered to the shaft 7 and thence transmitted to the load in any suitable manner. In the embodiment shown the left hand end of the shaft 7 has secured thereon a drive gear 20 which meshes with a load operating gear 21 which desirably is substantially smaller than the gear 20 for the reason that it is usually desired that the output shaft 22 be driven at a relatively high speed ratio with respect to the shaft 7 and consequently delivers less torque for a relatively long interval between winding cycles.

It is desirable, also, that the speed and torque of the output mechanism may be adjusted to suit different types of loads. This may be done by changing the ratio of the gears 20 and 21. Any suitable arrangement may be provided to accomplish this result. As shown, the gear 20 is removably mounted upon the shaft 7 by means of a gear-mounting hub 23 secured upon the shaft 7. The gear is keyed to the hub by means of a pin 24 or any suitable means and held in position by a retaining nut 25 threaded on the hub acting to hold the gear against a retaining shoulder formed on the hub.

The output shaft 22 is journaled in a bearing block 26 removably secured to the face of the adjacent supporting plate 8. The output shaft may be of any construction but for many applications a conventional flexible shaft is very desirable. For example, where the driven device must be maneuvered, such as in the case of a motion picture camera, not shown, a flexible shaft is highly desirable in which case the outer end of the shaft can be coupled directly to the driving shaft of the camera.

Means are provided for adjusting the speed and torque delivered to the output shaft. To accomplish this result, a plurality of mounting holes 27 are formed in the support plate 8 spaced at various distances from the axis of the shaft 7. Each pair of holes are at such distance from the shaft axis that one of a series of interchangeable gears will mesh with the gear 21.

When the motor is completely wound, special means are provided for controlling the energy stored therein to apply it to and disconnect it from the load. For this purpose, the shaft 7 is composed of an inner solid shaft 28 and an outer sleeve shaft 29 so constructed that the inner shaft is movable axially within the outer shaft but both shafts are coupled together so that one drives the other in rotational movement. At the right hand end of the shaft the pinion 19 is secured to the inner shaft 28 by a pin 30 which is received in and has axial movement in a slot 31 cut in the outer shaft 29. A clutch disc 32 is also mounted upon the outer shaft 29 in spaced relation to the pinion gear 19. The clutch disc is provided with means for anchoring it positively against rotation. To do this, a circular row of holes near its periphery are formed within which a locking pin 33 may be projected. The pin 33 is slidably received in a bracket number 34 secured to the adjacent plate 8. The pin 33 is provided with a spring 35 which normally holds the pin in withdrawn position. The pin 33 is also provided with a laterally projecting stud 36, upon which is mounted a roll 37. The roll 37 extends into the path of axial movement of the pinion 19. The spring 35 also acts under certain circumstances to automatically retract the pin 33 when the gear 19 is moved out of mesh with the winding gear 18.

The inner shaft 28 extends to the left beyond the left hand plate 8 and also beyond the end of the outer shaft 29 and has an operating knob 38 removably secured thereto. The knob provides a convenient means for moving the shaft 28 axially. The knob is removed when exchanging driving gears upon the hub 23.

The hub 23 is secured to the inner shaft 28 by a pin 24 which extends into a slot 40 in the outer shaft 29. The position of the hub 23 on the shaft is so adjusted that when the driving gear 20 is meshed with the gear 21 the pinion gear 19 is disengaged from the winding gear 18. Desirably the length of the slot 40 is adjusted to provide the correct degree of motion to intermesh one pair of gears at one end of the shaft 7 in one position of the inner shaft 28 and to intermesh the gears at the other end of the shaft 7 at the other extremity of the travel of the pin 24 in the slot 40. Axial movement of the outer shaft 29 is prevented by its attachment to the reel 6 which itself is confined between the plates 8.

The clutch plate 32 is connected to the shaft 29 through a special clutching device which is in the form of a spiral spring 41 of helical form having an internal diameter which closely fits upon the shaft 29. One end 42 of the spring is anchored to the clutch plate 32 in any suitable manner as by bending the end thereof into a position parallel to the shaft and projecting it into an aperture in the disc 32. The other end of the spring is free.

As will appear hereinafter, the clutch disc at times rotates upon the shaft 29. It is therefore mounted to freely rotate thereon but is held against axial movement by a pair of stabilizing collars 43 which are pinned or otherwise secured to the outer shaft 29.

Means are provided to prevent damage to the spring 5 due to overwinding and also due to over travel of the output shaft when the spring is unwound. To do this, automatic stop dogs 44 are provided upon both of the reels 6 and 10. These dogs are normally held in the position shown in Fig. 1 on the reel 6 by contact with the spring 5. The dogs are pressed outwardly by springs 45 surrounding guide pins 46 which are in turn anchored in the hubs of the reels. The dogs are received in slots in the outer flanges of each reel and are provided with shoulders 47. When the dogs are retracted by contact with the spring their shoulders 47 fail to engage a pair of stops 48 rigidly secured to one of the frame plates 8 as the reels rotate. When the dogs are released by unwinding the spring 5 from either one of the reels, as shown in Fig. 2, in connection with the reel 6, the shoulder 47 on the stop dog engages its respective stop 48 to prevent further rotation of the reel, thereby preventing damage to the spring at its point of anchorage to the reel.

In operation, the spring 5 is first tensioned by successively operating the pedal 12 in downward strokes. To start the winding operation, the shaft 28 is moved into its left hand position to intermesh the gears 18 and 19. At this time the pin 32 is moved into its position to anchor the clutch plate 32, by reason of its engagement with the roll 36, and thus place the clutching device in operation. As the shaft 29 is rotated in the spring winding direction the clutch spring 41 permits such rotation by reason of the fact that the slight friction between the convolutions of the spring and the shaft tend to unwind the spring and thus release the friction.

At the end of the downstroke of the pedal, the pinion 19 runs out of engagement with the segment gear and the operator's foot is removed from the pedal which permits the gear 18 and pedal 12 to rotate by their own momentum into reengagement with the pinion 19, at which time another downstroke of the pedal is executed. By repeating this series of motions the spring is wound. Other means, however, may be provided for actuating the gear 18. The partially wound spring tends to unwind during the period between downstrokes of the pedal, but the clutch spring at this time tends to wind itself tightly upon the shaft 29 to prevent such reverse rotation.

When the spring 5 is wholly wound the clutch mechanism holds it temporarily against unwinding. To apply the energy in the spring to the load the knob 38 is positioned toward the right, which disengages the winding gear 18 from its pinion 19 and causes the output gears 20 and 21 to intermesh which places the motor in condition for operating the load. At this time, the spring 35 tends to withdraw the pin 33 from the clutch disc 32. The strength of this spring may be adjusted to withdraw the pin against the friction imposed thereon by the tension of the spring 5 in which case the full power of the spring is immediately applied to the output shaft. The pin, however, should be properly positioned so that it will not release from the clutch disc until the gears 20 and 21 are at least partially intermeshed.

The spring 35 may have light tension sufficient only to hold the roll 36 against the pinion 19 when in released position but not sufficiently powerful to remove the pin 32 automatically. In such case when it is desired to apply power to the output shaft the pin 33 may be withdrawn manually.

Only a few turns of spring 5 have been shown in the drawing but many turns may be used to impart a relatively large capacity to the motor, thereby permitting it to operate the load for a relatively long period of time between rewinding cycles.

What is claimed is:

1. A mechanical motor comprising a driven shaft having a reel secured thereon, a spiral power spring secured to said reel and energized by unwinding from its pre-formed spiral conformation, a second reel connected to the other end of said spring acting as a receiver for the spring when it is deenergized, spring winding means and output means, manual control means acting simultaneously to connect said winding means and disconnect said output means to prepare for a winding cycle said control means acting also to disconnect said winding means and connect said output means to apply power to a load connected to said output and a one-way friction clutch acting to prevent unwinding of the spring during its winding cycle.

2. A mechanical motor comprising a power spring energized by unwinding it from a pre-formed spiral conformation, a first reel to which said spring is connected, an idler reel acting to receive said spring when it is deenergized, a main shaft secured to said first reel, manually operated means operable to rotate said reel to energize said spring, an output shaft connectable to said main shaft, a one-way helical spring type clutch surrounding said main shaft and acting to free it during the winding cycle and lock it against rotation to prevent unwinding the spring and means operable to disconnect the output shaft from the main shaft during winding and to reconnect said output shaft to the main shaft after the winding cycle is completed.

3. A mechanical motor comprising a power spring energized by deforming it from a pre-formed spiral conformation, a pair of rotatably mounted reels upon which said spring is mounted, a shaft secured to one of said reels, a helical coil friction type one-way clutch the convolutions of which normally surround and lightly engage said shaft, means temporarily to anchor one end of said helix the other end being free, manual means for winding said spring from one reel to the other, the direction of rotation of the winding operation acting to disengage the turns of the clutch spring from the shaft, said clutch spring acting to prevent reverse rotation of the shaft by tightening up the shaft, output means connected to said shaft and operable to drive a load and means to release the anchored end of said clutch whereby energy in the spring is applied to the load.

4. A mechanical motor comprising a power spring tensioned by deformation thereof from a pre-formed spiral, a frame, a pair of axially parallel reels rotatably mounted in said frame, means to anchor the ends of said spring respectively to each reel, said spring being received upon one of said reels when deenergized and on the other when energized, a combined input and output shaft secured to one of said reels, an input gear and an output gear secured to said shaft, a manually operable winding gear connectable to said input gear, a one-way friction clutch acting to prevent unwinding of said spring, a two-position control means operable through movement of said input and output gears simultaneously to activate the winding means and deactivate said output means and in its other position to deactivate the winding means and activate the output means and means to render said clutch inoperable.

5. A mechanical motor according to claim 1 together with reciprocating manual winding means.

6. A mechanical motor according to claim 1 and having means to disconnect the said winding means from the main shaft after the winding operation.

7. A mechanical motor comprising a power spring energized by unwinding from a pre-formed spiral conformation, a first reel to which said spring is connected, a second reel for receiving said spring when deenergized, a main power shaft secured to said first reel, manual means connectable to said shaft for winding said spring upon said first reel, an output shaft connectable to said main shaft, manual controlling means operable to connect said output shaft to said main shaft and simultaneously disconnect said winding means, said control means operable also to connect the winding means and disconnect the output means to said main shaft, a clutch disc rotatable on said main shaft, means to lock and release said disc against rotation, a helical one-way spring type clutch surrounding said main shaft one end of which is anchored to said disc and its other end being free, said clutch operating to prevent unwinding of the spring during its winding cycle and means to release said clutch disc during power delivery cycles of the spring.

8. A mechanical motor according to claim 7 together with automatic stop means acting to positively stop rotation of either of said reels before said power spring becomes entirely unwound therefrom.

9. A mechanical motor according to claim 7 together with means to change the ratio of drive between the said main shaft and the said output shaft.

10. A mechanical motor comprising a power spring energized by unwinding it from a pre-formed spiral conformation, a first reel to which the spring is connected, a second reel for receiving the spring when deenergized, a main shaft secured to said first reel, manually operable means connectable to said shaft for winding said spring upon said first reel, an output shaft connectable to said main shaft, manual control means operable to connect said main shaft to said control shaft and simultaneously disconnect said winding means therefrom said control means operable also to reconnect said output shaft and to disconnect said winding means from said main shaft, said control means including a secondary shaft axially movable within said main shaft and having means thereon to selectively inter-engage the main shafe with the winding or output means and a one-way friction clutch acting to prevent unwinding of the spring during its winding cycle.

References Cited in the file of this patent

UNITED STATES PATENTS

| 2,063,799 | Fornelius | Dec. 8, 1936 |
| 2,622,700 | Geyer | Dec. 23, 1952 |
| 2,647,743 | Cook | Aug. 4, 1953 |